(12) United States Patent
Grant et al.

(10) Patent No.: US 11,061,555 B2
(45) Date of Patent: Jul. 13, 2021

(54) IN-VEHICLE ACCESSORY

(71) Applicant: Portable Multimedia Ltd, West End (GB)

(72) Inventors: Robert George Grant, West End (GB); Graham Keith Lambert, West End (GB); Ceri Hill, West End (GB)

(73) Assignee: Portable Multimedia Ltd

( * ) Notice: Subject to any disclaimer, the term of this patent is extended or adjusted under 35 U.S.C. 154(b) by 0 days.

(21) Appl. No.: 16/263,447

(22) Filed: Jan. 31, 2019

(65) Prior Publication Data
US 2020/0218416 A1 Jul. 9, 2020

(30) Foreign Application Priority Data
Jan. 7, 2019 (GB) .................................. 1900211

(51) Int. Cl.
*H04N 5/225* (2006.01)
*G06F 3/0488* (2013.01)
*G06F 3/01* (2006.01)
*G06F 3/0484* (2013.01)
*B60R 1/12* (2006.01)
*B60R 11/00* (2006.01)

(52) U.S. Cl.
CPC ............ *G06F 3/0488* (2013.01); *G06F 3/017* (2013.01); *G06F 3/04842* (2013.01); *B60R 2001/1253* (2013.01); *B60R 2011/0003* (2013.01)

(58) Field of Classification Search
CPC ................ H04N 5/2251; H04N 5/2252; B60R 2001/1253

USPC .................................................. 348/373, 375
See application file for complete search history.

(56) References Cited

U.S. PATENT DOCUMENTS

| | | | |
|---|---|---|---|
| 2006/0164230 A1* | 7/2006 | DeWind | B60K 35/00 340/461 |
| 2009/0002491 A1 | 1/2009 | Haler | |
| 2011/0102483 A1* | 5/2011 | Kanamori | B60K 35/00 345/690 |
| 2012/0275160 A1 | 11/2012 | Tada et al. | |
| 2013/0083944 A1 | 4/2013 | Kvist et al. | |
| 2015/0200479 A1* | 7/2015 | Rhee | H04B 1/3816 439/607.35 |
| 2016/0085076 A1* | 3/2016 | Hoellwarth | G02B 27/017 455/566 |
| 2016/0119520 A1* | 4/2016 | Park | H04M 1/0264 348/373 |
| 2017/0349098 A1* | 12/2017 | Uhm | B60K 35/00 |

(Continued)

OTHER PUBLICATIONS

Partial International Search Report for Application No. PCT/GB2020/050021, dated Mar. 11, 2020, pp. 1-6.

(Continued)

*Primary Examiner* — Anthony J Daniels
(74) *Attorney, Agent, or Firm* — Lerner, David, Littenberg, Krumholz & Mentlik, LLP

(57) ABSTRACT

A housing for an accessory is disclosed. The housing comprises: a support region for a display screen for displaying images; the support region comprising a bezel comprising a narrow width just sufficient to maintain structural integrity of the housing material to retain a display screen to the housing, the width in the lower area of the bezel comprises a greater width compared to the narrow width to accommodate a microphone, the lower area comprising a microphone aperture.

13 Claims, 2 Drawing Sheets

(56) References Cited

U.S. PATENT DOCUMENTS

2018/0198981 A1* 7/2018 Li .................. H04N 5/44591
2019/0232866 A1* 8/2019 Holland ............. B60J 3/0204

OTHER PUBLICATIONS

Search Report for Application No. GB1900211.2, dated Jun. 25, 2020, 1 page.

* cited by examiner

IN-VEHICLE ACCESSORY

CROSS REFERENCE TO RELATED APPLICATIONS

The present application claims priority from U.K. Patent Application No. GB 1900211.2 filed on Jan. 7, 2019, all of which are hereby incorporated herein by reference.

TECHNICAL FIELD

The present invention relates to an in-vehicle accessory. In particular, but not exclusively, the present invention relates to an in-vehicle camera.

BACKGROUND

In-vehicle accessories are generally configured to be of small volume in order minimise the amount room the accessory takes up. This is particularly important for an accessory that is likely to be mounted in the eye-line of a vehicle driver such as an in-vehicle camera which is often mounted close to or even on a windscreen of a vehicle. A possible consequence is the arrangement of the Garmin Dash-Cam sold under the name Garmin Speak™, with part number: 010-01862-01, in which a microphone aperture is provided in the display screen. Additionally, user actuable controls may also be displayed on a display screen for camera set up and configuration. However, during normal use of the camera it may be desirable to avoid cluttering the display with user actuable controls.

A display of an in-vehicle accessory may be obscured or rendered indistinct by high levels of ambient light or provide a distraction to a vehicle occupant, in particular a vehicle driver, if the brightness of the display is too great during low levels of ambient light such as at night. Consequently, some vehicle accessories have a light sensor to sense ambient light and to adjust the brightness of the display in dependence on the ambient light levels measured. However, external light sources, particularly during night time operation, may intermittently illuminate a vehicle interior and give a false indication of ambient light levels in the vehicle.

The present invention has been devised with the foregoing considerations in mind.

SUMMARY

According to a first aspect of the present invention, there is provided a housing for an accessory, comprising:

a support region for a display screen for displaying images;

the support region comprising a bezel comprising a narrow width just sufficient to maintain structural integrity of the housing material to retain, and/or protect, a display screen to the housing, the width in the lower area of the bezel comprises a greater width compared to the narrow width to accommodate a microphone, the lower area comprising a microphone aperture. Increasing the width of the lower region of the bezel sufficient to accommodate a microphone and microphone aperture may maintain a maximal display area and avoid compromising the structural integrity and display quality of the display screen by incorporating a microphone behind the display screen and creating a microphone aperture in the display screen itself. Other regions at the same side as the display screen, such as providing a cover for electronics, may also be minimised. Moreover, placing the microphone aperture in the lower region of the bezel places the microphone aperture closer to the source of desired audio input, i.e. a vehicle occupant.

The lower area of the bezel may be further configured to accommodate at least two microphones and corresponding microphone apertures. Such an arrangement provides for the accessory to comprise a or at least two microphones.

The accessory may further comprise audio processing apparatus to process audio signals received from respective ones of the at least two microphones to enhance audio reception in a direction corresponding to an origin of an audio signal. Thus, audio reception may be enhanced for an individual speaker when compared to using just a single microphone.

Suitably, the at least two microphones and audio processing apparatus cooperate to form a directional microphone. Thus, a voice from a vehicle occupant may be better discriminated from ambient noise.

In accordance with a second aspect of the present invention, there is provided a housing for an accessory, comprising:

a support region for a display screen for displaying images;

the support region comprising a bezel comprising a narrow width just sufficient to maintain structural integrity of the housing material to retain a display screen to the housing, the narrow width extending around upper and lateral areas of the support region to a lower area and wherein the lower area of the bezel comprises a greater width compared to the rest of the bezel to accommodate a user actuable button. Increasing the width of the lower region of the bezel avoids cluttering the display with user actuable buttons and avoids the need for a touch sensitive display screen. Furthermore, a button disposed on the lower region of the bezel is closer to a vehicle occupant and so may be more readily actuated by the vehicle occupant.

Suitably, the housing further comprises a user actuable button. In particular, an in-vehicle camera may comprise a housing such as described above.

Suitably, such an in-vehicle camera may further comprise control circuitry operative to control camera functions, wherein the control circuitry is responsive to actuation of the user actuable button to inhibit overwriting of image data stored during a pre-set time period around actuation of the user actuable button.

Typically, the user actuable button is a push button.

In accordance with a third aspect of the present invention, there is provided an in-vehicle accessory, comprising a housing and a light sensor arranged so as to face toward a lower region of the interior of a vehicle in which the in-vehicle accessory is mounted when mounted in the vehicle, the in-vehicle accessory further comprising a display screen for displaying images and control circuitry operative to receive a signal representative of a magnitude of light sensed by the light sensor and to control a brightness of images displayed on the display screen in dependence on the magnitude of light sensed by the light sensor. Facing the light sensor towards a lower region of the vehicle interior may avoid or inhibit external light sources such as other vehicle lights or bright sunshine from being sensed and causing a reduction in the brightness of the display unnecessarily or inappropriately.

Suitably, the light sensor is disposed on a side of the housing oriented, when mounted in a vehicle, so as to face toward a lower region of the vehicle interior. Thus, the light sensor is faced towards the lower region of the interior of the vehicle as part of the mounting operation. Thus, there is no need for a user to separately orient the light sensor and so inadvertent failure to do so may be avoided.

More particularly, the light sensor is disposed on a side of the housing oriented, when mounted in a vehicle, so as to face downward in a direction toward the floor of the vehicle interior.

Typically, the in-vehicle accessory comprising a camera.

BRIEF DESCRIPTION OF THE DRAWINGS

One or more embodiments of the present invention are described further hereinafter, by way of non-limiting example only, with reference to the accompanying drawings in which.

DETAILED DESCRIPTION OF THE INVENTION

Figure 1:
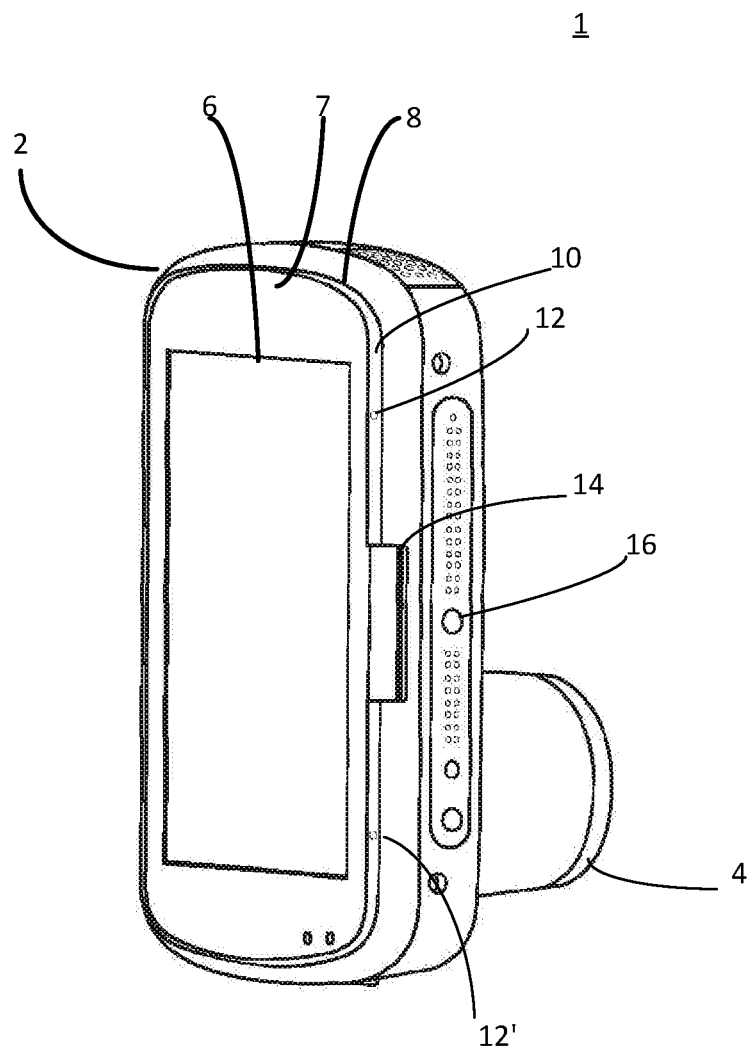
FIG. 1 illustrates an in-vehicle camera.

FIG. 1 illustrates an in-vehicle camera 1 having a housing 2. The in-vehicle 1 has a camera with a camera lens mount 4. At the rear of the housing 2 is a display screen 6 and support structure 7 retained by a bezel 8. The bezel 8 is made to have a width just sufficient to maintain sufficient structural integrity to retain in place and or protect the display screen 6 and support structure 7. The minimal width of bezel 8 is to keep the size of the camera housing 2 as small as is possible.

In the described embodiment, bezel 8 has a region 10, a lower region when the camera 1 is mounted, sized to accommodate two microphones respectively disposed behind apertures 12 and 12'. In the described embodiment the width of bezel 8 gradually tapers to increase the width to that of region 10. Sizing bezel region 10 to provide space for the microphones permits the microphone apertures 12 and 12' to be placed in a region of the camera housing 1 more likely to be closer to a vehicle occupant than if they were placed elsewhere on the housing 1. This may optimise placement of the apertures for audio reception which may be particularly useful if the camera 2 is to be controlled by voice commands.

Bezel region 10 also accommodates a push-button 14. Placing the push button 14 at a lower region of the camera housing 2 makes it more accessible to, and therefore actuable by, a vehicle occupant than if it were placed elsewhere on the housing 2. For example, an in-vehicle camera may be mounted toward the top of a vehicle windscreen, front window, and placing push button 14 on bezel region 10 tends to orient it downwards towards a direction from which a vehicle occupant may actuate it. This may make the push button 14 easier to actuate than if it were disposed on a part of support structure 7. In the described embodiment, push button 14 may be actuated to activate a "protect" mode in which control circuitry for the camera 2 protects image data stored in the camera from being overwritten for a pre-set period of time around the time of actuation of push button 14. Consequently, siting push button 14 where it is relatively easy to actuate may make protection of image data in the event of an incident, such as a traffic collision, easier to achieve.

In one or more embodiments, bezel 8, and wider region 10, includes a taper towards an outer edge of the housing 2 to form a bevel providing a smooth transition from the back surface of the camera to the side walls of the housing 2 in a curved profile. Such a tapered region or bevel is included in the definition of the term bezel 8 and wider region 10 as context requires.

Camera housing 2 also supports a light sensor 16 on a side of the camera housing that faces downwards (underside) when the camera is properly mounted in a vehicle. Light sensor 16 is a photodiode which produces an electrical current proportional to the visible light incident on it. Light sensor 16 is suitably packaged within a transparent capsule to protect the photodiode itself.

Figure 2:
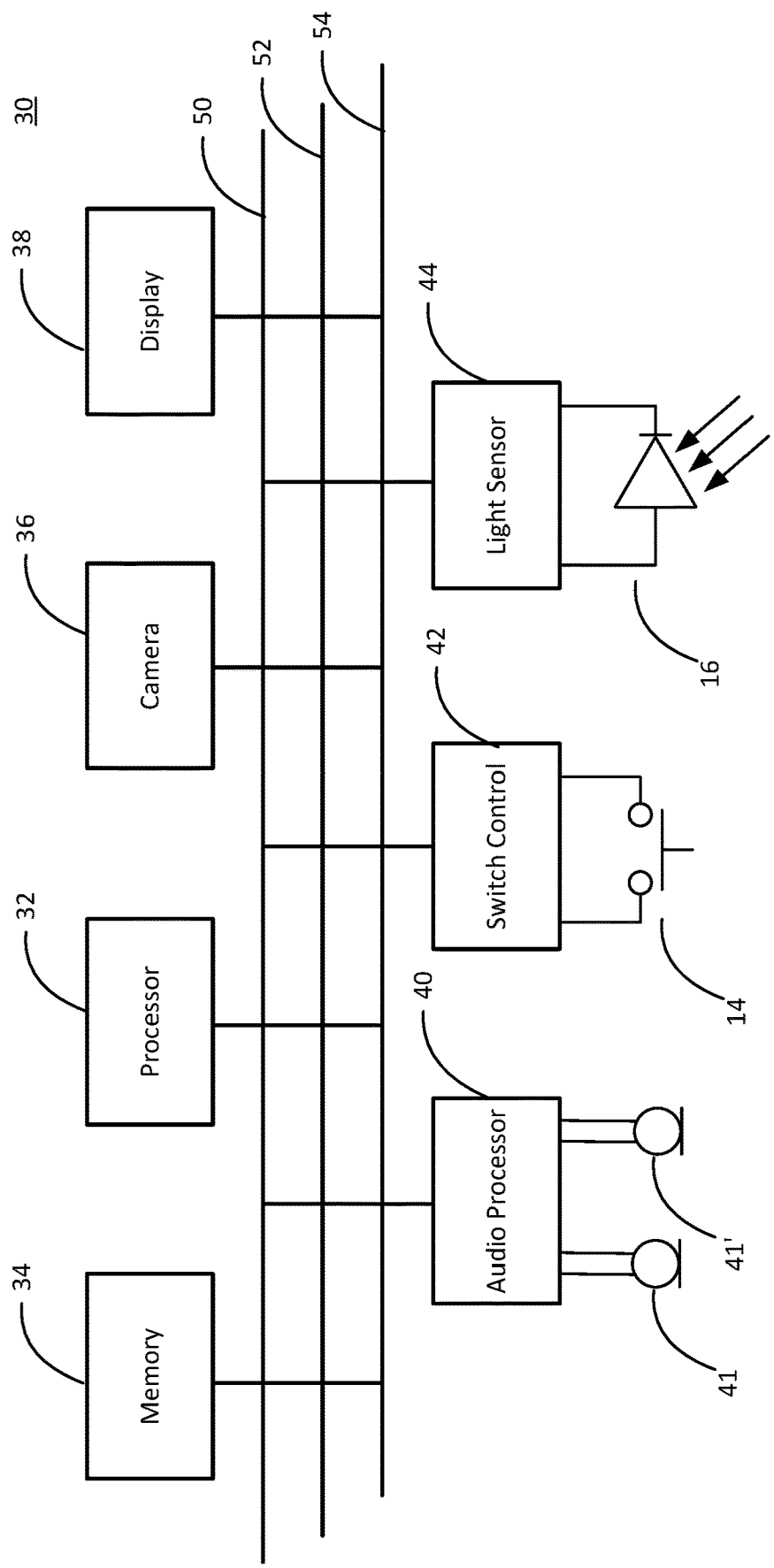
FIG. 2 illustrates a schematic circuit diagram for an in-vehicle camera illustrated in FIG. 1.

Turning now to FIG. 2, there is illustrated a schematic circuit diagram of an embodiment of control circuitry 30 for an in-vehicle camera 2 such as illustrated in FIG. 1. Control circuitry 30 includes a processor 32, such as an Ambarella A12, which executes program instructions stored in memory 34 for operating camera 2 and the various functional modules in the camera. Circuitry 30 also includes a camera control module 36 for driving the camera function of the camera 2. Camera control module 36 controls the read output of the camera sensor array image data and asserts the data on to the data bus 50 to be stored in memory 34. Address signals are sent over address bus 52 while control signals are sent over control bus 54. Camera image data is read by camera module 36 at periodic intervals suitable to maintain an image store of a moving image. Image data is also sent to display module 38 for display on display screen 6. A camera 2 may comprise other circuitry which is not illustrated in FIG. 2.

Control circuitry 30 also includes an audio processor module 40 which receives respective audio signals from microphone 41 and 41', the microphones respectively corresponding to apertures 12 and 12'. Audio processor module 40 is configured to process the audio signals from microphones 41 and 41' to phase adjust the audio signals relative to each other to form a directional microphone array using respective microphones 41 and 41'. The phase adjustment may be based on which of the audio signals has the greatest magnitude, i.e. is from the microphone closest to a speaker, so that the microphone array is directed to the speaker. Suitable modules for such audio phased array microphones may be implemented using a Microsemi ZL38063 digital signal processor.

A protect switch control module 42 is also provided and is configured to respond to actuation of push button 14 to assert an interrupt signal to processor 32. Processor 32 is configured to respond to an interrupt signal from switch module 42 to protect the image data that is collected around the time of actuation of push button switch 14. In the described embodiment, the protect time period extends from 15 seconds before actuation of push button 14 to 30 seconds after actuation of push button 14.

A light sensor module 44 is also provided and is configured to receive a current output from photodiode 16 and to provide a signal indicative of the received current to processor 32 over data bus 52. Processor 32 is configured to respond to the signal from light sensor module 44 to send a control signal to display module 38 to adjust the brightness of the display in accordance with the signal received from the light sensor module.

Any references made herein to orientation (e.g. top, bottom, upper, lower, front, back, and rear) are made for the purposes of describing relative spatial arrangements of the features of the apparatus, and are not intended to be limiting in any sense.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the terms "a" or "an" are employed to describe elements and components of the invention. This is done merely for convenience and to give a general sense of the invention. This description should be read to include one or at least one and the singular also includes the plural unless it is obvious that it is means otherwise.

In view of the foregoing description it will be evident to a person skilled in the art that various modifications may be made within the scope of the invention. For example, embodiments in accordance with the invention are not limited to any of the particular materials disclosed herein. Other materials suitable for performing the function described herein for a particular material may also be utilized in embodiments of the invention. For example, push button 14 may be interchanged for a touch sensitive button or some other suitable user operative actuator. Light sensor 16 has been described as implanted as a phot-diode but a phototransistor may be used.

Although an embodiment has been described in which image data is protected for 15 seconds before actuation of push button 14 and 30 seconds after, other time periods and ratio of before and after time periods may be utilised.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A housing for an accessory, comprising:
a support region for a display screen for displaying images, wherein the support region comprises a bezel, the bezel comprising:
an upper area,
lateral areas, and
a lower area,
wherein a width of the bezel is suitable to retain the display screen to the housing, a width in the lower area is greater than a width of the upper area and a width of the lateral areas, the width of the lower area is suitable to accommodate a microphone, and the lower area comprises a microphone aperture; and
a light sensor in a fixed mounted position on an underside of the support region different than a side of the lower area, wherein the light sensor is configured to face towards a bottom region of an interior of a vehicle and control a brightness of images displayed on the display screen, without requiring separate orientation of the light sensor.

2. The housing according to claim 1, the lower area is configured to accommodate at least two microphones and corresponding microphone apertures.

3. The housing according to claim 1, wherein the lateral areas taper between the width of the upper area and the width of the lower area.

4. An accessory comprising the housing according to claim 1, the accessory comprising at least two microphones.

5. The accessory according to claim 4, further comprising an audio processing apparatus to process audio signals received from respective ones of the at least two microphones to enhance audio reception in a direction corresponding to an origin of an audio signal.

6. The accessory according to claim 5, wherein the at least two microphones and the audio processing apparatus cooperate to form a directional microphone.

7. The accessory according to claim 4, further comprising an in-vehicle camera.

8. A housing for an accessory, comprising:
a support region for a display screen for displaying images, wherein the support region comprises a bezel, the bezel comprising
an upper area,
lateral areas, and
a lower area,
wherein a width of the bezel is suitable to retain the display screen to the housing, a width in the lower area is greater than a width of the upper area and a width of the lateral areas, and the width of the lower area is suitable to accommodate a user-actuable button; and
a light sensor in a fixed mounted position on an underside of the support region different than a side of the lower area, wherein the light sensor is configured to face towards a bottom region of an interior of a vehicle and control a brightness of images displayed on the display screen, without requiring separate orientation of the light sensor.

9. The housing according to claim 8, wherein the lower area further comprises a microphone aperture.

10. An in-vehicle camera comprising the housing according to claim 9.

11. The in-vehicle camera according to claim 10, further comprising control circuitry operative to control camera functions, wherein the control circuitry is responsive to actuation of the user-actuable button to inhibit overwriting of image data stored during a pre-set time period around actuation of the user-actuable button.

12. The in-vehicle camera according to claim 10, wherein the user-actuable button is a push button.

13. An in-vehicle dashboard camera, comprising:
a display screen for displaying images;
a housing for the display screen wherein the housing comprises a bezel, the bezel comprising
an upper area,
lateral areas, and
a lower area,
wherein a width of the bezel is suitable to retain the display screen to the housing, a width in the lower area is greater than a width of the upper area and a width of the lateral areas, the width of the lower area is suitable to accommodate a microphone, and the lower area comprises a microphone aperture; and
a light sensor arranged so as to be disposed and fixed on a side of the housing different than a side of the lower area, wherein the light sensor faces a floor of an interior of the vehicle and controls a brightness of images displayed on the display screen, without requiring separate orientation of the light sensor; and control circuitry operative to receive a signal representative of a magnitude of light sensed by the light sensor and to control the brightness of images displayed on the display screen in dependence on the magnitude of light sensed by the light sensor.

\* \* \* \* \*